Figure 3:
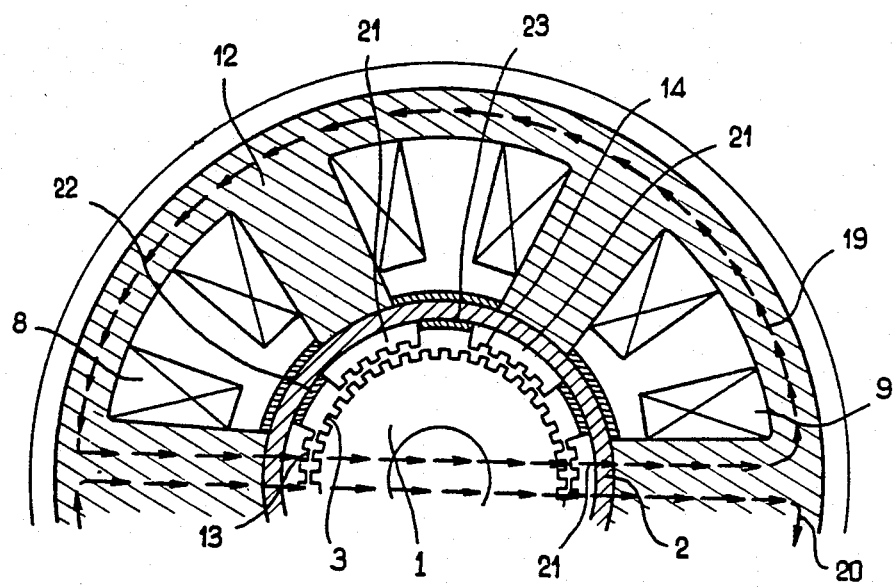

United States Patent [19]

Guedj et al.

[11] Patent Number: 4,508,984
[45] Date of Patent: Apr. 2, 1985

[54] VARIABLE RELUCTANCE ELECTRIC MOTOR FOR THE TRANSLATION OF CONTROL RODS IN A NUCLEAR REACTOR

[75] Inventors: F. Guedj; J. Defaucheux, both of Jeumont; A. Wiart, Sannois, all of France

[73] Assignee: Jeumont-Schneider Corporation, France

[21] Appl. No.: 396,489

[22] Filed: Jul. 8, 1982

[30] Foreign Application Priority Data

Jul. 8, 1981 [FR] France .................. 81 13448
Apr. 30, 1982 [FR] France .................. 82 07540
May 27, 1982 [FR] France .................. 82 09303

[51] Int. Cl.³ ........................................ H02K 41/00
[52] U.S. Cl. ........................................ 310/14; 318/135
[58] Field of Search ............... 310/12, 14; 318/135

[56] References Cited

U.S. PATENT DOCUMENTS 3,219,853  11/1965  Schreiber ..................... 310/14
3,548,273  12/1970  Parodi et al. ................. 310/14
3,906,262   9/1975  Shichida et al. .............. 310/12
4,370,577   1/1983  Wakabayashi et al. ........ 310/12

FOREIGN PATENT DOCUMENTS 506930  1/1977  U.S.S.R. ..................... 310/12

Primary Examiner—Donovan F. Duggan
Assistant Examiner—Anita M. Ault
Attorney, Agent, or Firm—Rines and Rines, Shapiro and Shapiro

[57] ABSTRACT

In accordance with the invention, the motor includes: a rotor component composed of a shaft (1) of magnetic material provided with regularly spaced projections (3), and a stator component comprising at least three multipolar stators encircling the shaft consecutively, each polar core having cavities on the shaft side so as to constitute projections (13) of the same width and spacing as those of the shaft, with the spacing between stators being such that the projections of the shaft and those of the polar cores face one another for only one of the stators. A tight casing (2) is arranged to intersect the stator magnetic circuit and magnetic parts (21) extend the polar core to the interior of the casing. Application to nuclear reactors.

8 Claims, 3 Drawing Figures

U.S. Patent   Apr. 2, 1985   Sheet 1 of 2   4,508,984
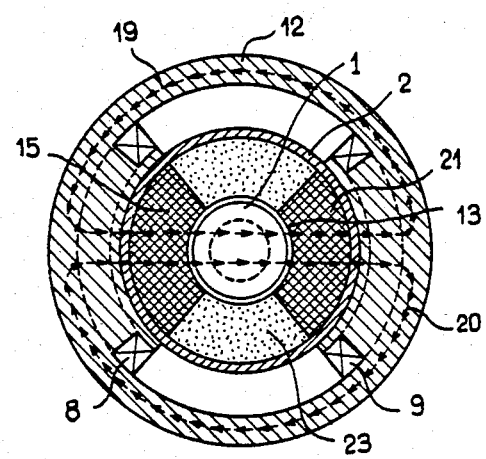
FIG_1
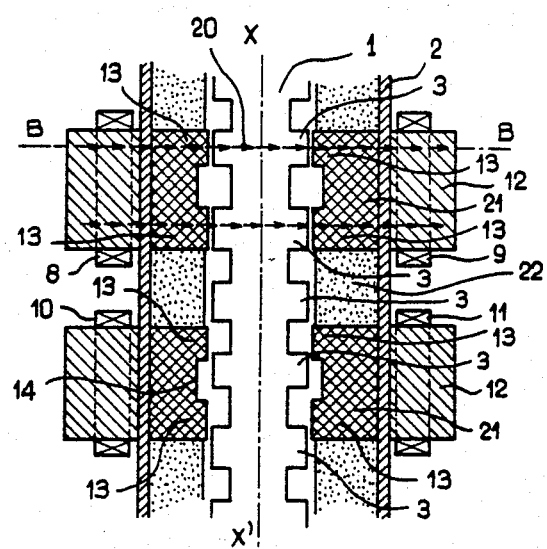
FIG_2

VARIABLE RELUCTANCE ELECTRIC MOTOR FOR THE TRANSLATION OF CONTROL RODS IN A NUCLEAR REACTOR

This invention concerns a variable-reluctance electric motor with transverse flux, intended specifically to provide the translation of control rods in the interior of a pressurized enclosure in a nuclear reactor, possibly after conversion of a rotary motion into a translation motion by means of a system of the screw-nut type.

It is known that the power developed by the reactor can readily be controlled by regulating the insertion into the core of a nuclear reactor of rods having the property of absorbing neutrons, for example rods of boron carbide. To this end, the rods are generally integral with a movable shaft moving in a tight casing attached to the reactor with temperature and pressure conditions identical to those prevailing in the reactor vessel prevailing in the casing.

In accordance with French Patent Application No. 1,371,802, a mechanical load-transfer element provided with three-position jaws and controlled by the use of solenoids is utilized to impart a translation motion to the rods. This device, operating as an electromagnet, has the drawback of imparting an abrupt motion to these movable elements. This results in the necessity of arranging locally buffers or cushions, such as those described in Belgian Pat. No. 753,529, for example. Nevertheless, despite the presence of such buffers, the mechanisms of the jaws experience severe constraints which generate wear. To avoid this drawback, it has been proposed, for example, in French Pat. No. 1,455,472, to use an electromagnetic motor whose movable element is composed of the rod itself, which then carries annular projections arranged so as to provide a variable reluctance motor of the vernier type, giving rise to a translation motion devoid of any motion of rotation. However, it has not been possible productively to make use of such a motor, on the one hand because of the fact that it requires a large number of coils constituting the stator section of the motor, and on the other hand, because of a poor efficiency because of saturation of the shaft due to the axial concentration of the magnetic flux.

It is the object of this invention to avoid these drawbacks. With this objective, the electric motor pursuant to the invention includes a rotor component composed of a shaft of magnetic material equipped with regularly spaced projections and a stator component comprising at least 3 multipolar stators encircling the shaft consecutively, with each polar core having cavities on the shaft side so as to constitute projections of the same width and spacing as those of the shaft, with the spacing between stators being such that the projections of the shaft and those of the polar cores face one another for only one of the stators.

Pursuant to the invention, a tight casing is arranged at the intersection of the stator magnetic circuit, with magnetic tips extending the polar cores to the interior of the casing.

The invention will be understood better, and other purposes, characteristics, and benefits will appear more clearly to the reader of the description which follows, to which is attached a sheet of drawings of one embodiment of the invention.

FIGS. 1 and 2 represent schematically an electric motor producing a movement of translation applied to the control rod in a nuclear reactor, respectively in transverse section and in axial section in the plane BB, pursuant to a first embodiment conforming to this invention; and FIG. 3 represents schematically a partial transverse section of an electric motor producing a movement of rotation.

With reference to FIGS. 1 and 2 at this time, in the application of the motor to the translation of control rods of a nuclear reactor, the rotor (moving) component of the motor, i.e., the shaft 1, is arranged coaxially in a tight tubular casing 2. The shaft 1, made of a magnetic material, is equipped with annular projections 3 regularly spaced along the axis of the shaft to define cavities between the projections.

The stator component of the motor is composed of an assembly of generally tubular shape with the same axis xx' as the shaft, comprising at least three multipolar stators. Each of these latter is composed of a pair of coils 8, 9 and 10, 11, arranged rigidly around the polar core.

A magnetic yoke 12 of annular shape encircles each pair of coils. The tight casing 2 is located to intersect the stator magnetic circuit. Each polar core which extends to the interior of the casing 2 by means of a magnetic element or tip 21 has annular cavities 14 on its internal wall, so as to constitute projections 13 in the form of a sector, in each aperture made by the coils, and arranged in different transverse planes, these projections 13 being of the same width and the same spacing as the annular projections 3 with which the shaft 1 is provided.

In order to produce a structure of the vernier type, the consecutive multipolar stators are spaced along the axis xx' of the motor in such a way that the annular projections 3 of the shaft 1 do not face the projections 13 of the polar core except for only 1 of the stators, as shown in the illustrations. Thus, using the examples shown, when the pair of coils 8, 9 is excited, the movable shaft 1 positions itself so that the reluctance opposite to the magnetic flux is minimal. This occurs when the annular projections 3 of the shaft 1 precisely face the corresponding projections 13 of the corresponding polar core. It should be noted that in the illustration, only two pairs of coils have been shown even though three are necessary to provide bidirectional motion.

The flux produced is closed along a path transverse to the casing, i.e., perpendicular to the axis xx' of the shaft 1, as represented by the small arrows 19 and 20. Consequently, this shaft does not experience any axial magnetic saturation. To displace the shaft, for example by a rising motion, it requires only that the power to the pair of coils 8, 9 be shut off and that the pair of coils 10, 11 be excited. At that moment, the magnetic field produces a force in the axial direction which tends to position the shaft so that the reluctance opposing the magnetic flux is minimal. The annular projections 3 of the magnetic shaft 1, because of this, position themselves facing the projections 13 of the polar core corresponding to the coils 10 and 11.

To provide proper positioning of these magnetic elements 21, and likewise to provide guidance for the shaft 1, buffers of non-magnetic material 22 and 23 are provided inside the tight casing 2, between the magnetic elements 21 of the various polar cores. Thus, the effective clearance, i.e., between the annular projections 3 of the shaft 1 and the projections 13 of the polar cores, is reduced, while a parasitic clearance resulting from the presence of the tight casing 2, if this is made of a non-magnetic material, is created in the stator magnetic circuit. However, this parasitic gap is created between two fixed magnetic parts arranged face to face, and consequently the dispersion of the magnetic flux in this air gap is very small. If the casing is made of a magnetic material, there remains a slight dispersion of the magnetic flux between the annular projections, which does not affect the proper operation of the motor. In other respects, the areas of the magnetic parts facing one another are maximum, resulting in an optimal magnetic efficiency. Pursuant to a preferred form of embodiment of the invention, the annular projections 13 are of less height than the corresponding cavities 14, and the ratio of their respective lengths is equal to 3/5. The depth of each cavity 14 is three times greater than the width of the effective air gap.

In one example of embodiment, the pressure vessel 2 of stainless steel had a thickness of 10 mm and an outside diameter of 100 mm. The width of the effective air gap was approximately 1 mm. The teeth had a pitch of 8 mm, and the cavities had a depth of 3 mm. With a magnetic shaft 1 with a diameter of 78 mm, the induction coils having 468 turns each with a principal core 230 mm in height and 110 mm in width, the force achieved was equal to 3,000 newtons for a current of 27 amperes.

With reference now to FIG. 3, the motor shown produces a motion of rotation at very low speed and very high motor torque. Furthermore, it is possible to give it a large number of possible positions per revolution. In its application to the control of the translation of a rod, it is necessary to add to it a system of the well-known screw-nut type which will not be described here. Since the operation and the structural components of this motor are identical to those described above, the references indicated on FIG. 3 are the same as those used in the other illustrations, although the projections 3 and 13 are longitudinal instead of being annular.

It will be noted that the casing 2 which provides the seal from the primary fluid can be made just as well of a nonmagnetic material as of a magnetic material, for example stainless steel. With a thin casing, the pressure forces exerted on it are absorbed by the structure of the stator component itself.

It is obvious that, to obtain a higher precision of the positioning of the shaft, it is preferable to make use of more than three multipolar stators since their number is not limited by any possible axial magnetic saturation of the shaft, with the path of the magnetic flux never assuming a direction parallel to the axis in the shaft.

However, the precision of the motion and the nominal force transmitted can also be increased with a three-stator motor by exciting successively a first stator, then a first and a second stator, then the second alone, then the second and the third simultaneously, then the third alone, then the third and the first simultaneously, and so on. When two stators are excited simultaneously, the intensity of the current can be reduced while maintaining a stable situation, which leads to a reduction of the electrical consumption. Very obviously, any modification made by one skilled in the art within the meaning of this invention does not depart from the scope of this invention.

We claim:

1. A variable-reluctance electric motor having a moving component arranged in a tight cylindrical casing, characterized by the fact that the moving component comprises a shaft of magnetic material provided with regularly spaced projections defining cavities therebetween, and by at least three multipolar stators arranged along the shaft consecutively in a direction of movement of said moving component, each stator comprising a core including a pair of core parts arranged diametrically opposite each other outside of said casing with magnetic tips extending the core parts inside the casing, said tips having cavities facing the shaft and defined by projections of the same width and spacing as those of the shaft, with the spacing between said stators being such that the projections of the shaft and those of the tips face one another for only one of the stators, and coils on the core parts oriented to produce magnetic flux along paths extending transversely to and through the shaft and casing between each pair of tips and not substantially along the length of the shaft, said stators having yoke means external thereto to close the magnetic flux paths between each pair of tips.

2. A motor in accordance with claim 1, characterized by the fact that a buffer of nonmagnetic material is located between said tips in the interior of said casing so as to improve the positioning and guidance of the shaft.

3. A motor in accordance with claim 1, characterized by the fact that said casing is made of a nonmagnetic material or a magnetic material.

4. A motor in accordance with claim 1, characterized by the fact that the height of each of said tip projections along the length of the shaft and the height of each of said tip cavities along the length of the shaft are essentially in the ratio 3/5.

5. A motor in accordance with claim 1, characterized by the fact that the depth of each tip cavity transverse to the shaft is essentially three times greater than the width of the effective air gap between the tips and the shaft.

6. A motor in accordance with claim 1, characterized by the fact that the shaft is adapted to be displaced by exciting successively a first stator, then a first and second stator together, then the second stator alone, then the second and third stators simultaneously, then the third stator alone, and then the third and first stators simultaneously.

7. A motor in accordance with claim 1, characterized by the fact that the projections and cavities of the shaft are annular and the projections and cavities of the stators are sectoral.

8. A motor in accordance with claim 1, characterized by the fact that the tips are sectoral and the projections and cavities extend parallel to the length of the shaft.

* * * * *